United States Patent
Sancho Ponce et al.

(10) Patent No.: US 8,975,564 B2
(45) Date of Patent: Mar. 10, 2015

(54) AEROHEATING OF SENSOR PROTECTED BY INTEGRATING DEVICE SEEKER (ASPIDS)

(75) Inventors: Jorge Sancho Ponce, Tres Cantos (ES); Pedro Jose Herraiz Alijas, Tres Cantos (ES); Rafael Rebolo Gomez, Tres Cantos (ES); Carlos Miravet Fuster, Tres Cantos (ES); Aitor Arce Aguinaga, Tres Cantos (ES); Jose Maria Fernandez Ibarz, Tres Cantos (ES); Daniel Ribas Nieto, Tres Cantos (ES)

(73) Assignee: Sener Grupo De Ingenieria, S.A., Madrid (ES)

( * ) Notice: Subject to any disclaimer, the term of this patent is extended or adjusted under 35 U.S.C. 154(b) by 0 days.

(21) Appl. No.: 14/110,109
(22) PCT Filed: Apr. 4, 2011
(86) PCT No.: PCT/EP2011/055179
§ 371 (c)(1),
(2), (4) Date: Oct. 7, 2013
(87) PCT Pub. No.: WO2012/136239
PCT Pub. Date: Oct. 11, 2012

(65) Prior Publication Data
US 2014/0014765 A1    Jan. 16, 2014

(51) Int. Cl.
*F41G 7/22* (2006.01)
*G02B 27/00* (2006.01)
(Continued)

(52) U.S. Cl.
CPC ............. *G01J 1/0271* (2013.01); *F41G 7/2253* (2013.01); *F41G 7/2293* (2013.01); *F42B 10/46* (2013.01); *F42B 15/01* (2013.01); *G02B 27/0018* (2013.01); *G02B 27/0006* (2013.01)
USPC ........... 244/3.16; 244/3.1; 244/3.15; 359/601

(58) Field of Classification Search
USPC .................. 244/3.1, 3.15–3.3; 343/872, 873; 250/200, 216, 336.1, 338.1, 339.01, 250/339.02, 352, 353; 359/601–608
See application file for complete search history.

(56) References Cited

U.S. PATENT DOCUMENTS 2,457,393 A * 12/1948 Muffly ..................... 244/3.16
3,293,437 A * 12/1966 Boydell .................. 250/338.1
(Continued)

OTHER PUBLICATIONS

PCT/EP2011/055179 Written Opinion of the International Searching Authority, dated Oct. 4, 2013.
(Continued)

*Primary Examiner* — Bernarr Gregory
(74) *Attorney, Agent, or Firm* — Kunzler Law Group, PC

(57) ABSTRACT

This invention advances the related state-of-the-art by eliminating the physical EO window used by electro-optical imaging infrared seekers for tactical missiles and high-altitude endo-atmospheric interceptors, widely employed in integrated defense systems. This invention increases the probability of intercepting exo-atmospheric ballistic warheads by exo-atmospheric interceptors, and eliminates the existing altitude "gap" of interception, as well as the geographical limitations posed by the mesospheric Noctilucent Clouds. The problem of protecting an imaging EO sensor from aeroheating is solved in this invention by a special purpose device which is enabled immediately after the nose cone ejection event. The role of said device is to augment the sensor fixed sunshade and cavity lengths in the forward direction, and by doing so, the resulting new cavity enables the optimal injection of an optically inert gas into the new extended cavity in front of the sensor, thus effectively blocking the entry of the compressed hot air into the sensor cavity, while simultaneously avoiding any adverse effects of inducing flow instabilities in the flow as well as the disturbance of the injected gas flow on sensor structures. Having a greater length for the hot gas to penetrate, eliminates also the penetration of suspended particles in oncoming air stream.

16 Claims, 13 Drawing Sheets

(51) Int. Cl.
*G01J 1/06* (2006.01)
*G01J 1/02* (2006.01)
*F42B 10/46* (2006.01)
*F42B 15/01* (2006.01)
*F41G 7/00* (2006.01)

(56) References Cited

U.S. PATENT DOCUMENTS

| | | | | |
|---|---|---|---|---|
| 3,925,783 | A * | 12/1975 | Bleday et al. | 343/872 |
| 3,963,926 | A * | 6/1976 | Borrello | 250/338.1 |
| 4,155,521 | A * | 5/1979 | Evans et al. | 244/3.16 |
| 4,339,097 | A * | 7/1982 | Kordulla et al. | 244/3.16 |
| 4,850,275 | A * | 7/1989 | Utreja et al. | 244/3.16 |
| 5,365,746 | A * | 11/1994 | Warner et al. | 244/3.16 |
| 5,372,333 | A * | 12/1994 | Uwira et al. | 244/3.16 |
| 6,462,889 | B1 * | 10/2002 | Jackson | 244/3.17 |
| 6,530,539 | B2 * | 3/2003 | Goldman et al. | 244/3.16 |
| 7,002,154 | B2 * | 2/2006 | Wellman et al. | 250/352 |
| 7,786,418 | B2 * | 8/2010 | Taylor et al. | 244/3.16 |
| 7,926,961 | B2 * | 4/2011 | Shaw et al. | 359/602 |
| 8,075,144 | B2 * | 12/2011 | Shaw et al. | 359/601 |
| 8,146,862 | B2 * | 4/2012 | Chirivella et al. | 244/3.22 |
| 8,373,105 | B2 * | 2/2013 | Eiane et al. | 244/3.16 |
| 8,466,407 | B2 * | 6/2013 | Martin et al. | 250/216 |
| 8,569,668 | B2 * | 10/2013 | Chirivella et al. | 244/3.16 |
| 8,692,172 | B2 * | 4/2014 | Preston et al. | 244/3.16 |
| 2009/0308273 | A1 | 12/2009 | Chirivella et al. | |

OTHER PUBLICATIONS

PCT/EP2011/055179 International Search Report, dated Oct. 11, 2012.

Garner, Tim; Technical Attachment. International Conference on Space Planes and Hypersonic Systems and Technologies: SR SSD 2002-31, Oct. 2002, NWS Spaceflight Meteorology Group, NASA Johnson Space Center.

* cited by examiner

KV forward section

Sensor
Sun shade (US Navy SM-3 Block 1, Jane's, 2010)

KV forward section
Sensor cover
Sun shade
Nose cone
Split line

Removed sensor cover
Sensor
Sun shade

AEROHEATING OF SENSOR PROTECTED BY INTEGRATING DEVICE SEEKER (ASPIDS)

FIELD OF THE INVENTION

This invention relates to the protection of a missile electro-optical (EO) seeker assembly, i.e. an EO sensor, from damage caused by an external high speed air stream laden with dispersed multi-phase particles due to (a) aero-heating by the hot gas of the oncoming stream invading the sensor cavity, with consequent severe degradation of the image due to differential thermal expansion of the telescope structures, and (b) erosion of the optical coatings by the abrasive particles suspended in the high speed oncoming air as it occurs in certain geographical regions of the planet.

STATE OF THE ART

Nowadays most missile systems use imaging electro-optical (EO) sensors to acquire and track targets, usually in combination with other sensors means such as laser and radio frequency (RF) seekers. These missiles can be widely classified into categories:

(a) Tactical missiles,
(b) High altitude endo-atmospheric missile defense interceptors, and
(c) Space missile defense interceptors.

(a) Tactical Missile Systems.

These missiles operate at low and mid-altitudes within the atmosphere, and use a variety of seekers to hit air and ground based targets. Increasingly so, and to avoid countermeasures, the end game in tactical missiles is executed by imaging EO seekers that are installed behind a window to protect them from the oncoming stream. These special purpose windows are usually located at the nose of the vehicle, and let the light of interest pass through to the sensor. The aero-heating of a tactical missile may become a problem when the vehicle speed increases to supersonic speeds, and develops a bow shock wave whose strength increases with the flight speed. The compressed gas behind the shock is superheated by the shock and overheats the vehicle nose where the EO window is installed, as shown in FIG. 1.

These EO windows cannot be used at yet higher speeds than supersonics as their aero-heating causes the window's temperature to vary from one point of its surface to another, thus affecting the window local optical properties. This differential change in window temperature distorts the image and degrades target resolution. The top speed of tactical missiles using imaging EO seekers is limited by the severity of the aero-heating that these windows can tolerate.

(b) High Altitude Endo-Atmospheric Missile Defense Interceptors.

These interceptors are intended to provide a territorial defense shield against short and mid-range attack missiles. They can intercept targets at altitudes as high as 40 km, and their whole flight occurs within the atmosphere, although they only reach hypersonic speeds at high altitude. They are guided by ground radar during the early segments of flight, but switch to the onboard imaging seeker to guide the vehicle to the proximity of the target to effect the end-game maneuvers. Although they may be equipped with an active radio frequency (RF) seeker, the trend is to equip them also with imaging EO seekers.

These missiles reach very high speeds at high altitude and experience very high thermal loads, although the aero-heating is mitigated due to the lower atmospheric density. The present practice is to also employ EO windows to protect the optics, just as it is done in EO seekers of tactical missiles. Their performance could be substantially increased if they could accelerate earlier at higher speeds, but this is hampered by the need to keep the aero-heating rates on the EO windows at acceptable levels, in a similar way as in tactical missiles.

(c) Space Missile Defense Interceptors.

The upper layer of missile defense is organized to stop an attack by intercontinental ballistic missiles (ICBM) and other warheads that could potentially reenter the atmosphere, and is implemented by means of a complex network of exo-atmospheric interceptors, so named because the interception occurs in space at very high speeds in order to kinetically destroy the warheads by direct impact on a precise point, rather than by an explosive, and thus assure complete destruction of the warhead contents during their re-entry into the atmosphere. This is accomplished by a precise guidance of the kinetic kill vehicle (KV), a ballistic platform that optically tracks the warhead and guides it to impact by means of an imaging EO seeker and a divert and attitude control system (DACS).

The sequence of operations for the interception of a warhead can be appreciated in FIG. 2. An attacking ICBM launch is detected by one of the satellites of the early warning system network, and its early trajectory is determined by a low-frequency high power ground radar. After command to fire from a control center, this information is transferred to the appropriate battery of space interceptors where a set of high-frequency/high-resolution radars determine the ICBM trajectory and its properties; a command is then sent to launch one or more interceptors. These preliminary operations may last only a few seconds.

Depending on the type of ICBM and its trajectory, the interceptor ascending trajectory is planned to arrange for an interception as early as possible, before the ICBM deploys the payload and proliferates the real target with a swarm of decoys. Present state of the art requires that to exercise this option, the interceptor has to fly at very high speeds, and its launch site be close to the ICBM launch site. This requires most of the times reaching high altitude as quickly as possible and then accelerate the KV to the highest possible speed. Until this point, the interceptor powered stages are guided and controlled by the onboard inertial unit, with updates from ground radars. Eventually, the nose cone is jettisoned, and separation of the ballistic KV occurs. The KV is equipped with an EO imaging seeker which tracks and provides input for the optical guidance of the KV. The equipment is installed within the nose cone that acts as a protecting shroud during the ascent trajectory. At some point, current upper stage designs reach an altitude where the aero-heating rates are low enough that the protective nose cone can be jettisoned to optimize KV kinetics, and the EO sensors become thus exposed without requiring an EO window. In high energy missions, this limitation translates in the inability to intercept certain targets of interest due to the exceeding of the sensor thermal limits. The task of acquiring, identifying, tracking and intercepting an incoming ballistic missile is very challenging. A delay of even a few seconds in engaging the target can affect the situational awareness of the battlefield.

Therefore, the ability to accurately determine the target's position and to initiate an early EO tracking, is critical to accomplishing the interception mission, and a consequence of the limitations imposed by the aero-heating of present EO systems is that in addition to maximum flight speeds, there are altitude and latitude regions where the ability of intercepting ICBM warheads is seriously compromised. These regions are:

(a) The altitude "gap",
(b) The Noctilucent Clouds.

The altitude gap exists between the interception of high altitude endo-atmospheric missiles and space interception of ICBMs. This gap could be eliminated if EO tracking could be performed accurately at lower altitudes, i.e. if the protective nose cone could be jettisoned at lower altitudes and the aero-heating rates could be kept low by special EO seeker design, regardless the value of the flight speeds. Furthermore, the present practice of using EO tracking by means of unprotected and windowless focal plane telescope sensors is compromised when flying through the Noctilucent Clouds, as the optics can be damaged by the abrasive 0 to 100 mn size ice particles naturally resident in these regions.

A qualitative schematic diagram of the battlespace of the different regions in terms of altitude vs. interceptor flight velocity is schematically represented in FIG. 3.

As already discussed, imaging EO seekers are used by all of the three types of missiles exposed above, i.e. tactical missiles, high altitude endo-atmospheric interceptors and exo-atmospheric missile defense interceptors. In the first and second class of EO seekers, the missile maximum speed is limited by the need to keep the aero-heating rates on the refracting EO window below certain levels. In the third class, an altogether different challenge is presented by the imaging EO seeker operation, since it is used to track the warheads at high altitude at very high flight and target closing speeds, and the need for a very high resolution in the imaging EO to effect a kinetic interception at a specific point of the warhead.

The prior art approach consists of protecting the imaging EO sensor until the density is sufficiently low for the sensor to be exposed bare to the low-density high speed stream without incurring in prohibitive aero-heating rates. According to this, there exists a need for a non-refracting transparent window to protect the imaging EO sensors from high aero-heating rates as well as abrasion damage to coatings in the three classes of missiles discussed above.

The sensor of a generic imaging EO seeker for exo-atmospheric interceptors consists of an all-reflecting focal plane Cassegrain telescope installed on the missile forward section and a detector chamber (5), as shown in FIG. 4. A cryostat and a set of electronics packages and completes the EO seeker system.

To shelter the sensor from the sun, the telescope is protected by a cylindrical sunshade (1) surrounding the primary mirror (2) and the secondary mirror (2a). The relative locations of the telescope optical components are held in place by means of a set of rigid sensor connecting structures, typically a center tower (3) and a stiffening tripod (4). The whole assembly of mirrors (2 and 2a) and detector chamber (5) is mounted on the KV forward area (6). The resulting sensor assembly is in this manner housed within a cavity (7) formed by a KV mounting forward platform (8) and the sunshade (1).

Important to this art is the existence of dynamic loads from the KV forward platform (6) to the EO sensor, which can be quite severe, especially during periods of active burning of the onboard motors and DACS. It is for this reason that the sensor connecting structures (3, 4) need to be sufficiently rigid to avoid image jitter caused by loss of the allowable dynamic tolerances of mirrors (2 and 2a) and detector (5). To circumvent this difficulty, the sensor mount, as well as the connecting structural members (3, 4) need to be sturdy and cannot be easily removed from cavity (7).

Other important element of this art is that the length allocation for the seeker is typically quite small, as the whole vehicle needs to be fitted with a standard pre-existing container. This length limitation compromises the length of the sunshade (1), and has a negative impact on the operational envelope of the interceptor as the phase angle target-KW-Sun needs to be considered in planning the approach trajectories. The signal to noise ratio (SNR) of the sensor telescope is also improved with longer sunshades. To summarize, shortening the sunshade (1) can severely limit the operational limits of the interceptor and hamper its ability to reach a few challenging warhead targets.

As represented schematically in the four views of FIG. 5, the high resolution imaging EO seeker of an exo-atmospheric interceptor is protected from the external stream by a nose cone shroud, and the telescope sensor is further isolated by a protective cover that fits on the sunshade (1), see FIG. 5a. At an altitude of about 70 to 80 km, when the interceptor drag is no longer an issue, the nose cone is jettisoned to reduce mass and thus increase mission performance. If the flight speed at this point in time is not too high, the jettisoning mechanism of the nose cone produces also the removal of the sensor protective cover, see FIGS. 5b and 5c. In ICBM target interceptions requiring high energy missions the flight speed is very high, and the ejection of the sensor protective cover is delayed until the anticipated aero-heating rates are deemed sufficiently low as not cause image degradation. In this case, the mechanism for the protective cover removal is independent from the nose cone jettisoning mechanism, and the reliability of the system is negatively impacted due to the increase in EO seeker system complexity. An image of a typical prior art KV with the nose cone and sensor protective cover removed is shown in FIG. 5d.

In response to the ever present need to enable imaging EO seekers as early as possible, it is known a recent patent application for an Active Vortex Cooling System (AVOCS) described in US Patent Application No. US-2009/0308273, wherein an Active Vortex Control System (AVOCS) and a method for isolation of sensitive components from external environments is disclosed. Said document points to the possibility of achieving early exposures of the sensor at lower altitudes than they are practiced in the prior art. AVOCS technology makes use of an optically-inert gas that is tangentially injected into the sunshade (1) sensor cavity (7) shown in FIG. 4 to produce a vortex flow pattern. The role of this vortex is to prevent the hot atmospheric air from entering the sensor cavity (7) where the optics and electronics components are located.

The application of the AVOCS concept, however, is hampered by potential vortex pattern breakup caused by interference with the sensor connecting structures (3, 4) installed in the cavity (7), and this occurrence is aggravated when the sunshade (1) becomes shorter and the injection of gas in front of the sensor is no longer doable, as the patent application claims. Furthermore, the dynamic and thermal equilibration of 100 nm ice particles which are present in the Noctilucent Clouds, as disclosed in "Tim Garner: Technical Attachment. International Conference on Space Planes and Hypersonic Systems and Technologies: SR SSD 2002-31, October 2002, NWS Spaceflight Meteorology Group, NASA Johnson Space Center", require a critical length from the shock to the primary mirror (2) that may not be achievable when using short sunshades (1), exposing thus the mirror sensitive optical coatings to being damaged by the abrasive ice particles present in these regions. This risk may result in mission failure.

DESCRIPTION OF THE INVENTION

A first aspect of the present invention relates to a protection device for a missile imaging EO seeker as defined by claim 1. Furthermore, a second aspect of the present invention relates to a protection device implemented on an anti-missile interceptor and on a tactical missile that are equipped with an imaging EO seeker, as defined by claims 10 and 11 respectively.

A third aspect of the present invention relates to a method for increasing the probability of interception of a missile without geographical or altitude limitations as defined by independent claim 12.

A fourth aspect of the present invention relates to a method that allows to operate tactical missiles at higher flight speeds as defined by independent claim 13.

Particular embodiments of the invention are set out in dependent claims.

Specifically, the invention overcomes the limitations of the prior art by means of:

(a) Deploying at least one deployable sunshade with respect to a fixed sunshade that, in addition to improving the seeker optical performance, permits to inject an optically-inert gas forming a convenient flow pattern within the sensor new forward facing cavity.

(b) The optically-inert gas is injected into the sensor forward facing cavity of the sensor optics, in a manner such that the resulting flow pattern is highly stable, such as one or more vortices or other stable flow structures.

(c) The highly stable flow pattern structures effectively block the oncoming high speed stream from entering the cavity and prevents the damaging to the sensor optical coatings which could be otherwise caused by: (a) aero-heating by the hot gas of the oncoming stream that invading the sensor cavity can cause severe degradation of the image due to differential thermal expansion of the telescope connecting structures, and (b) erosion of the optical coatings by the abrasive ice particles suspended in the high speed oncoming air that may occur in certain geographical regions of the planet where mesospheric Noctilucent Clouds are regularly found.

The invention can be employed by an anti-missile interceptor imaging EO seeker when performing scene acquisition of a missile threat, discriminating the moving target from a swarm of decoys, and subsequent EO tracking of the moving target. When using this invention, the imaging EO seeker can be operated by a high speed missile interceptor without any environmental limitations, and can operate at any latitude, any flight speed, and at any altitude, from sea level to space.

The invention can also be adopted by any missiles, including tactical missiles that incorporate some type of imaging EO seekers, regardless of whether they are interceptors or not. For the sake of brevity, the invention will be described in terms of an application typical of an exo-atmospheric missile defense interceptor, but de description applies also to tactical missiles and high-altitude endo-atmospheric defense interceptors that use imaging EO seekers.

Since the embodiment of the invention is essentially identical in the three applications, the present description will be focused to the most challenging application where there is no alternate solution at present, namely:

(a) Increasing the probability of an exo-atmospheric interception by means of starting earlier the guidance of the KV, and this is made possible when allowing operation of the its imaging EO seeker at lower altitudes.
(b) The method of allowing an exo-atmospheric missile to operate in the "gap" region.
(c) The method according to the invention also allows the operation of the imaging EO seeker while flying through the Noctilucent Clouds.
(d) The method of increasing the SNR of the EO seeker without increasing the length of the seeker system.

The prior art approach consists of protecting the imaging EO system until the density is sufficiently low for the sensor to be exposed bare to the low-density high speed stream without incurring in prohibitive aero-heating rates. It is an object of the present invention to eliminate the need for a refracting window to protect the EO sensors from aero-heating to the three classes of missiles discussed above, or to delay the exposure of the exo-atmospheric EO sensors to the high speed stream, and thus provide relief to the aforementioned limitations. The present invention advances the related state-of-the-art by eliminating the physical refracting EO window of tactical missiles. This translates in an advantage, as the thermal limitations imposed by the non-homogeneous aero-heating of the physical refracting window have been removed, and the missile can continue its acceleration to any desired hypersonic speed, while simultaneously tracking and discriminating the target, using the high resolution imaging EO seeker, and thus deceiving potential EO countermeasures.

The invention has also a notable impact on the state-of-the-art of high altitude endo-atmospheric missile defense interceptors, as it permits to expose at lower altitudes their imaging EO seeker sensor, improving the data fusion process in the hand-over from target radar tracking to optical homing tracking, and thus increase the probability of target destruction by proximity fuse and/or kinetic impact.

Nevertheless, perhaps the biggest advance of this invention is in the area of exo-atmospheric hit-to-kill (HTK) missile interceptors where it does more than just increasing the probability of kinetic impact, but it eliminates the existing interception "gap" of exo-atmospheric interception, as well as the geographical limitations posed by the mesospheric Noctilucent Clouds. Elimination of the gap is accomplished by an early start of the guidance of the KV as its imaging EO seeker becomes fully functional at lower altitudes, well within the atmosphere, and at higher speeds. This translates in a gain of 5-10 seconds in the initiation of optical observations, and narrows the initial target error by extending the interval of data fusion during the execution of the radar hand-over algorithms. The earlier tracking only necessitate smaller divert corrections, saving propellant, and permitting to allocate a larger mass to the EO sensor to increase its resolution. Flying through Noctilucent Clouds is facilitated by the longer path travelled by the small ice crystals, since the cavity becomes much longer due to de deployable sunshade, giving the particles enough time to become in dynamic equilibrium with the gas phase, and be either deflected around the sensor sunshade, or sublimated altogether.

Thus, the problem of protecting an imaging EO sensor from aero-heating is solved by the invention by means of a special purpose device (See FIGS. 6 and 7) which is enabled immediately after the nose cone ejection event. The role of said device is to augment the sensor sunshade and cavity lengths in the forward direction, by using a preferred system of pneumatic actuators to push forward at lest one deployable sunshade. The resulting longer cavity enables the optimal injection of an optically inert gas into the extended cavity in front of the sensor (See FIG. 7), thus effectively blocking the entry of the compressed hot air into the sensor cavity, instead of the proposed AVOCS method discussed above which injects the gas too close or within the sensor cavity and causes flow interference with the sensor structures. The resulting highly stabilized flow pattern according to the invention is in stark contrast with the AVOCS method, and avoids the adverse effects of inducing instabilities in the otherwise stable flow, as well as the forces that the injected gas flow exerts on sensor structures, as the case would be if the gas were instead injected within the short cavities that are typical of present imaging EO seekers.

Having a greater length for the hot gas to penetrate, helps also to both, dynamically reject and thermally eliminate the ice particles that are present in certain geographical regions in the mesosphere, and where entry flights of the NASA Shuttle Orbiters are restricted to avoid erosion of its thermal protection system. The present invention eliminates said operating restrictions.

Furthermore, the extension of the sunshade leads to a further benefit, as it results in an increase in the EO seeker signal to noise (SNR) and does away with the operational drawbacks of limiting the sunshade length to comply with a not-to-exceed vehicle container length.

The invention contemplates the possibility to install a sunshade cover to protect the sensor optics from molecular and particle contamination which can be produced and accumulated during storage, transportation, launch, ascent, and nose cone release. According to a preferred embodiment, this sunshade cover (See FIG. 6) can be held in place by a retainer ring that is attached to one of the split nosecone halves. Once the nosecone and retainer are jettisoned, the cover is free to move, and it is safely ejected immediately after nose cone ejection during the aforementioned deployment process, with minimal risk of damage to the seeker components.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF A PREFERRED EMBODIMENT OF THE INVENTION

Figure 1:
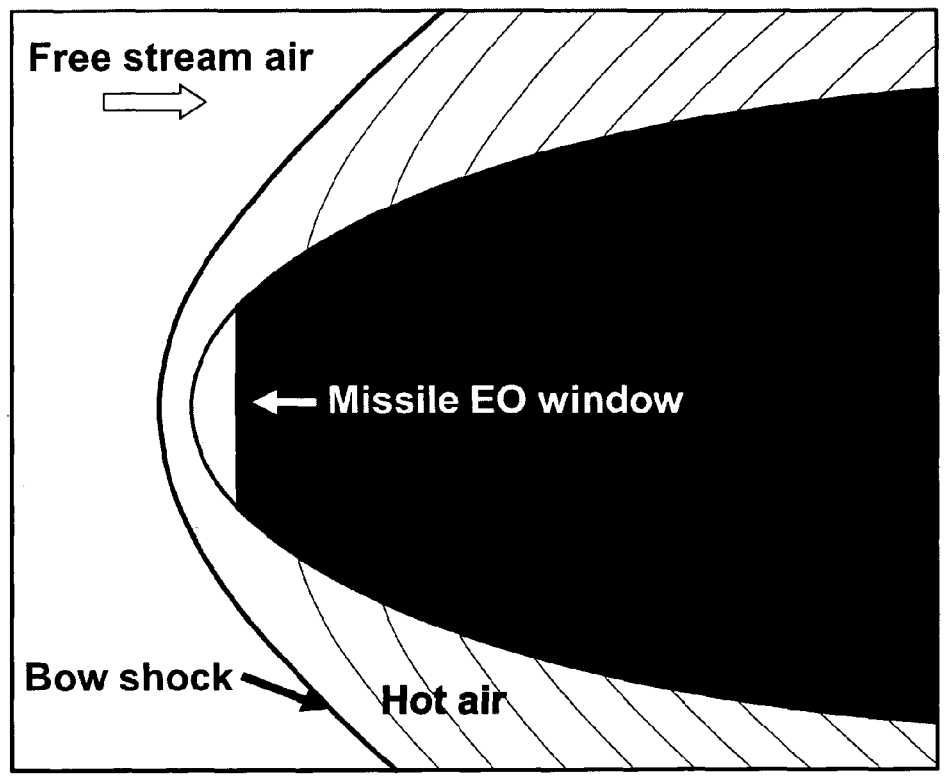
FIG. 1.—Shows an schematic view of the aero-heating of an EO window in a missile, wherein the free stream air and the bow shock have been represented, as well as the hot air area.
Figure 2:
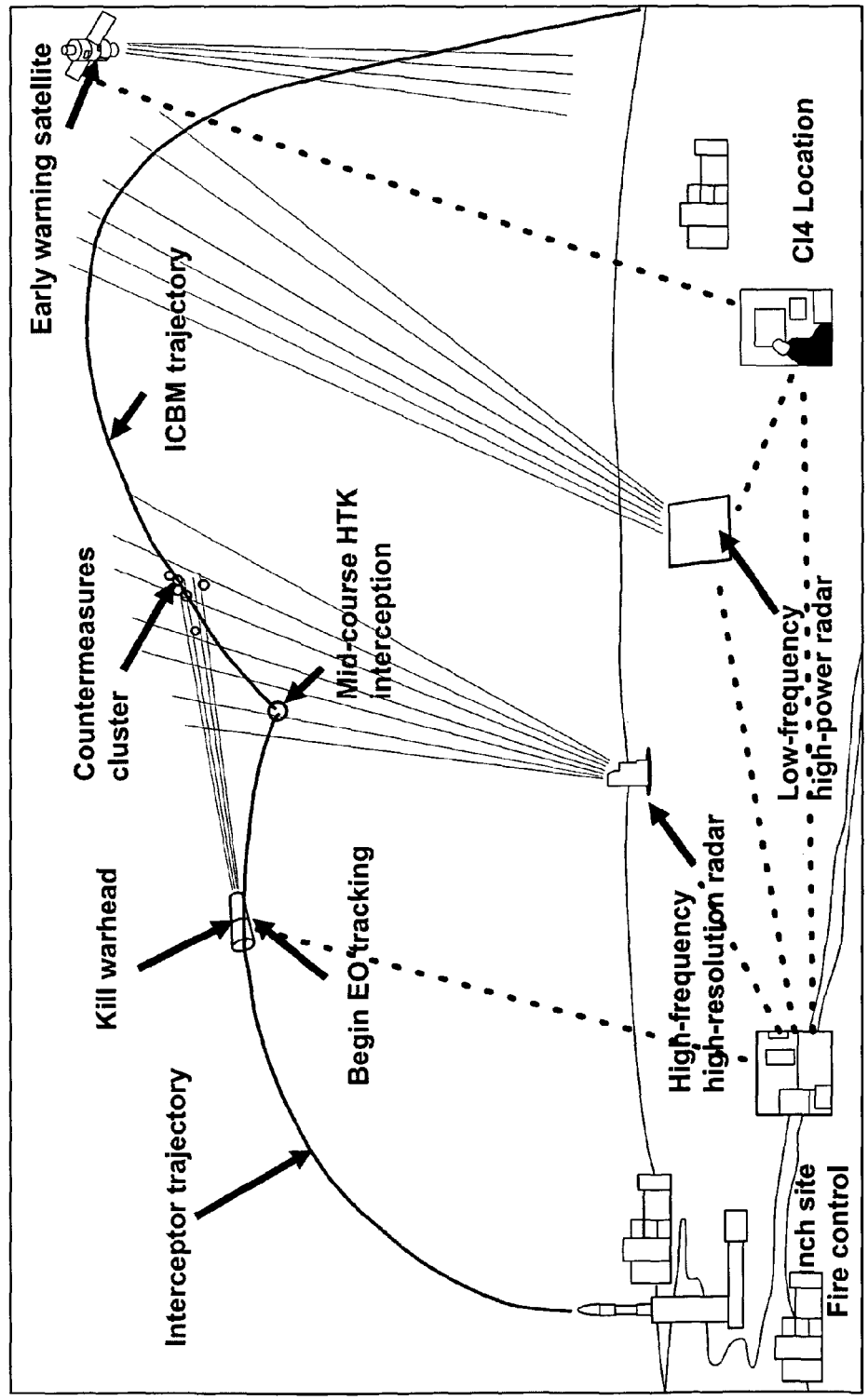
FIG. 2.—Shows a schematic view of the sequence of operations for an exo-atmospheric mid-course hit-to-kill (HTK) interception of a Space Missile Defense System, specifically for an Intercontinental Ballistic Missile (ICBM) system.
Figure 3:
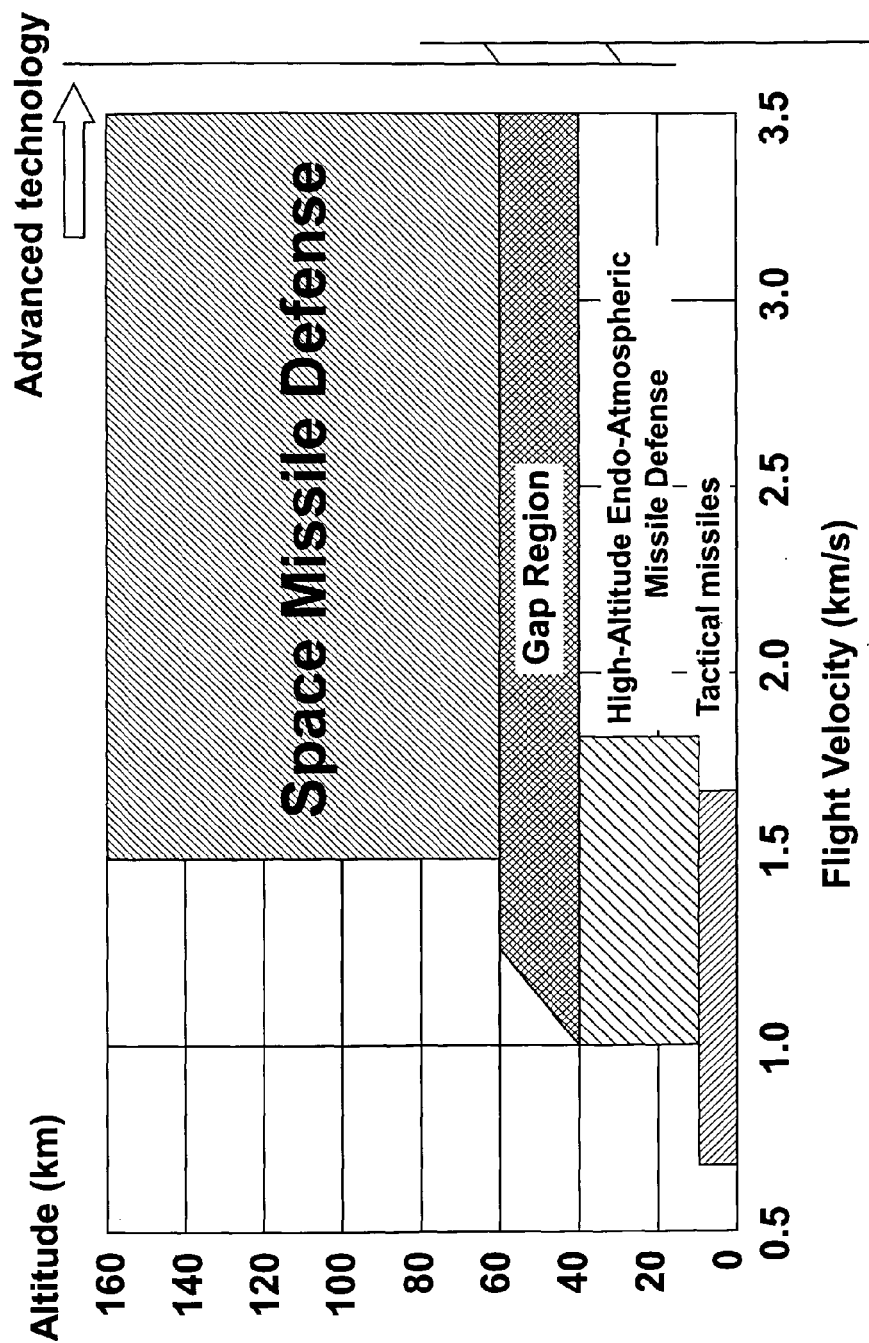
FIG. 3.—Shows a graphical representation of battle space in terms of altitude (km) and flight velocity (km/s) for the three classes of interceptors.
Figure 4:
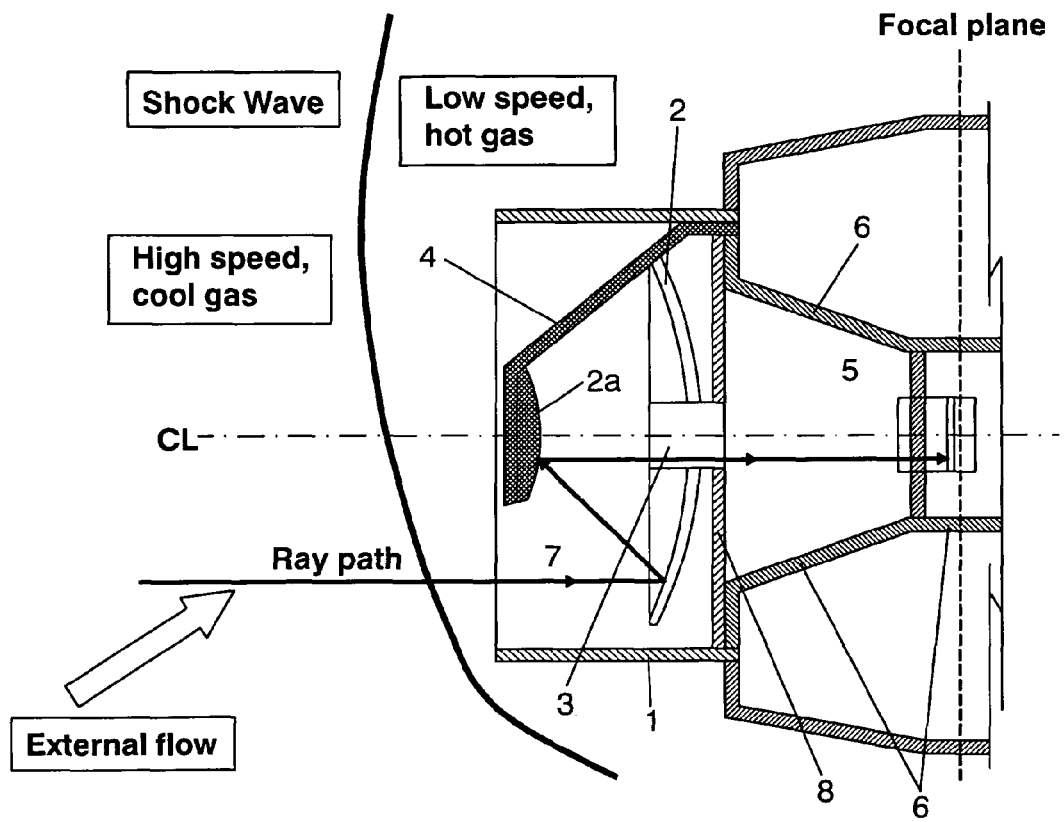
FIG. 4.—Shows a schematic longitudinal section diagram of the aero-heating of a generic EO seeker sensor assembly of the prior art, wherein the external flow, the shock wave, the high speed cool gas and the low speed hot gas have been represented, as well as the focal plane of the sensor and the ray path.

This invention consists of a set of apparatus, methods, and procedures to allow the EO tracking and imaging of a moving target by a high speed missile interceptor at any altitudes, from sea level to space (See FIG. 3), as required by missiles employing imaging EO seekers that detect, discriminate and lock onto high value moving targets. For the sake of brevity, the invention will be described in terms of an application typical of a space missile defense interceptor, but it can also be applied to tactical and high-altitude endo-atmospheric missile defense interceptors that use imaging EO seekers.

It is the object of this invention to eliminate the refracting EO window in tactical missiles and permit their acceleration to hypersonic speeds, while tracking and discriminating the target by the imaging EO seeker, and allow it to reach the target faster while simultaneously deceiving countermeasures.

It is the object of this invention to expose at lower altitudes the imaging EO seeker sensor used by high altitude endo-atmospheric missile defense interceptors, and thus increase the probability of target destruction by proximity fuse and/or kinetic impact.

It is the main object of this invention to increase the probability of an exo-atmospheric hit-to-kill interception by enabling an early start of the guidance system of the intercepting KV, as its imaging EO seeker becomes fully functional at lower altitudes, well within the atmosphere and at higher speeds.

It is a further object of this invention to increase the imaging EO seeker signal to noise (SNR) and eliminate operational drawbacks by allowing for an extendable sunshade and still retain the total missile length limits imposed by a not-to-exceed container length.

It is the object of this invention to apply the same method to the three classes of missiles, and thus provide relief to the aforementioned limitations.

Figure 5B:
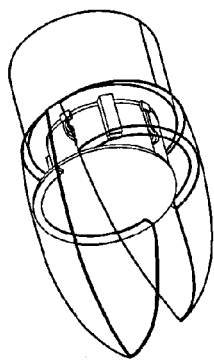
FIG. 5b.—Shows a schematic perspective view of the assembly represented in FIG. 5a when jettisoning of nose cone and sensor.
Figure 5D:
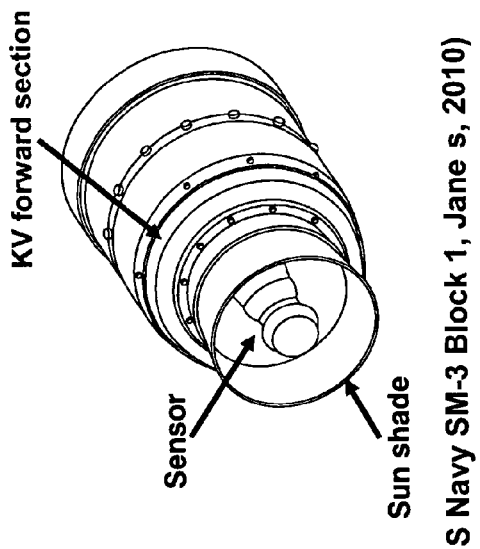
FIG. 5d.—Shows an image of a typical prior art forward section of a KV showing a bare seeker, sensor, and sunshade (USNavy SM-3 Block 1, Jane's, 2010).
Figure 5A:
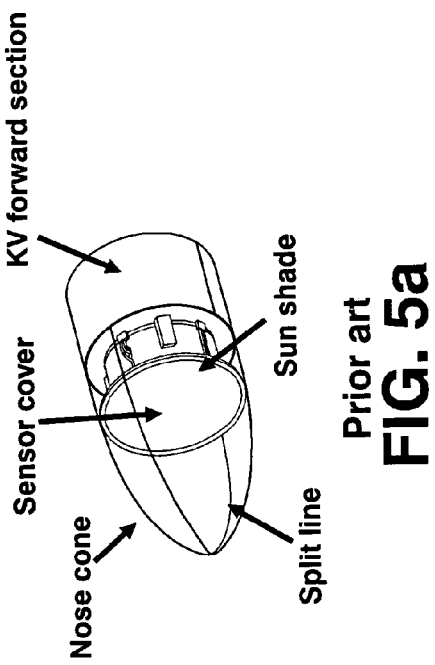
FIG. 5a.—Shows a schematic perspective view of a nose cone, sunshade and sensor cover assembly of a Kill Vehicle (KV) forward section of the prior art, wherein the split line has been represented.
Figure 5C:
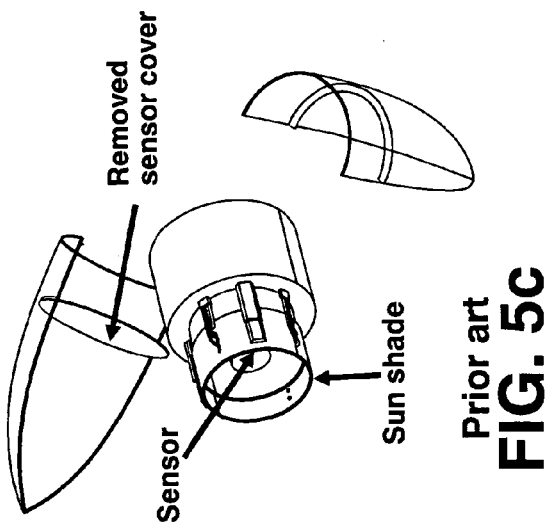
FIG. 5c.—Shows a schematic perspective view of the trajectory of nose cone halves and sensor cover of the prior art assembly shown in FIGS. 5a and 5b.

The problem of protecting from aero-heating an imaging EO sensor is solved in this invention by a special purpose device which is enabled during the nose cone ejection event (See FIGS. 5a,b,c). The object of said device is to augment the sensor cavity length in the forward direction (See FIGS. 6 and 7). The achieved longer cavity (7) enables the optimal injection of an optically inert gas into the space made available by the newly extended cavity which is forward of the sensor. The resulting flow pattern (9) in FIG. 7, avoids the adverse effects of flow destabilization, as well as the deleterious effects on the image quality caused by the corresponding aerodynamic forces on the sensor structures, if the gas were injected instead within the short cavities that are typical of present imaging RD seekers.

Figure 6:
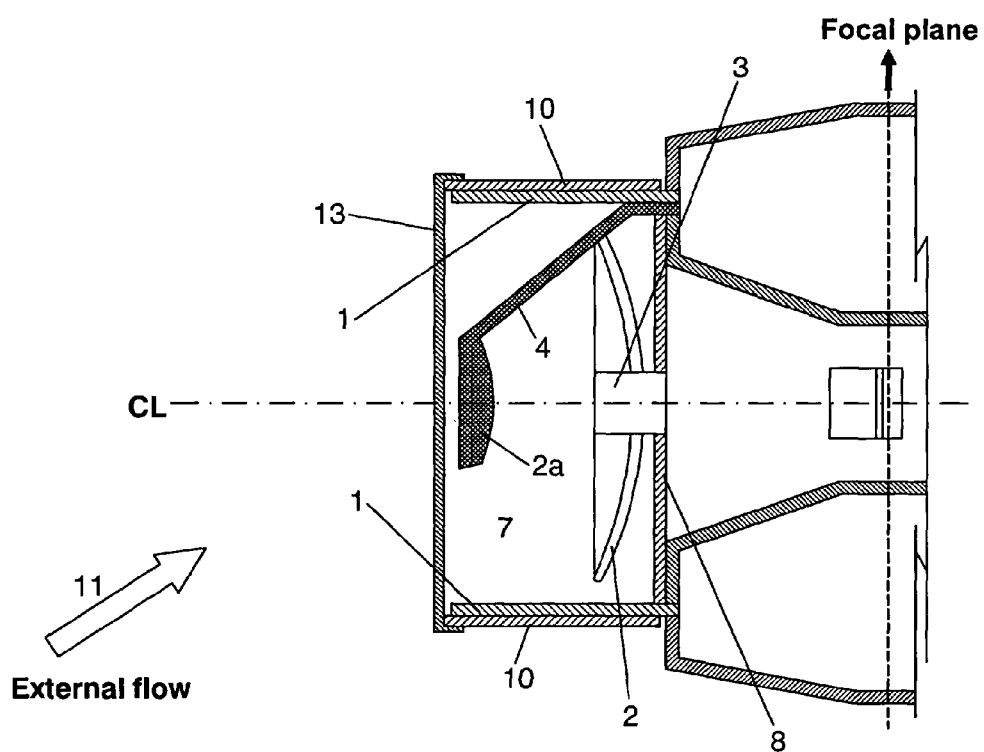
FIG. 6.—Shows a longitudinal section schematic diagram of a generic EO seeker sensor assembly equipped with the protection aero-heating blocking device of the invention, wherein the deployable sunshade is shown in a retracted first position and a sunshade cap cover is isolating the cavity, the external compressed hot air having been represented by an external arrow.
Figure 7:
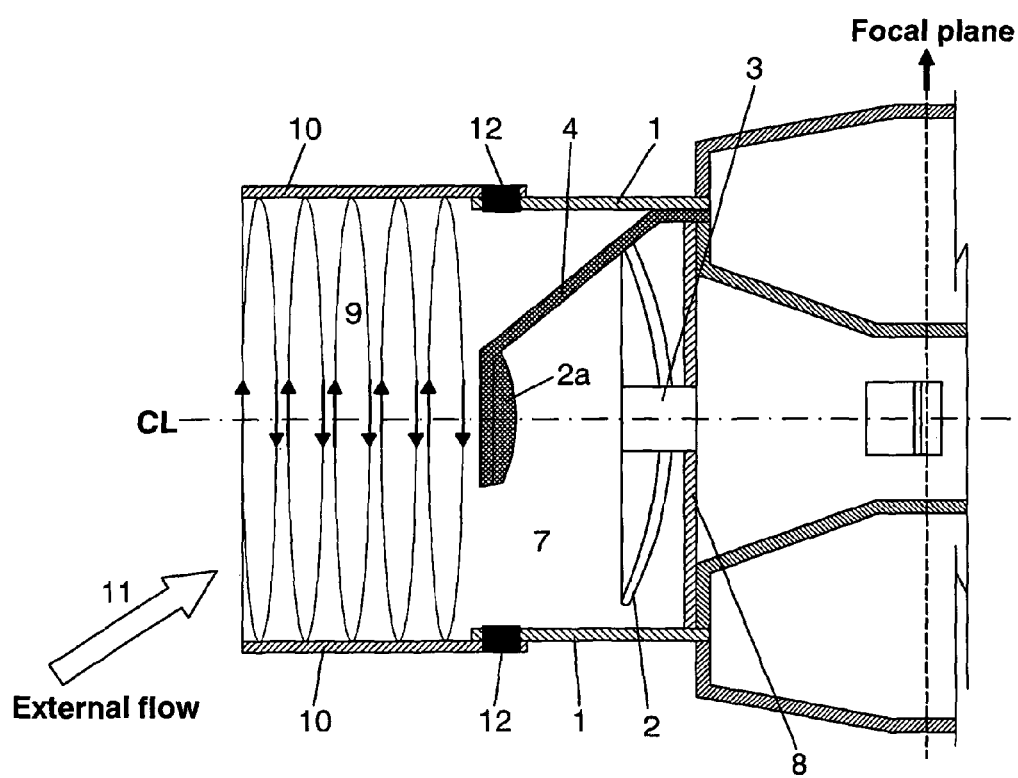
FIG. 7.—Shows a longitudinal section schematic diagram of a generic EO seeker sensor assembly equipped with the protection device of the invention, wherein the deployable sunshade is shown in an extended second position.

It is the object of this invention to adopt for the device an embodiment, see FIGS. 6 and 7, that consists of an additional deployable sunshade (10) configured as a cylindrical assembly, and installed parallel and next to the EO sensor fixed sunshade (1), the latter being a special purpose fixed cylindrical assembly (1). The deployable sunshade (10) of FIG. 6 is retracted during storage, launch, and ascent trajectory, but it is in an extended position after the nose cone is ejected.

It is the object of this invention, see FIG. 7, to arrange for the deployable sunshade (10) to slide forward and parallel to the fixed sunshade (1) until their stops (12) make contact, resulting thus in a longer cavity (7).

It is a further object of this invention to install a sunshade cap cover (13) to protect the sensor optics from molecular and particle contamination produced during storage, transportation, launch, ascent, and nose cone jettisoning (See FIG. 6). This sunshade cap cover (13) is held in place by a retainer ring that is attached to one of the nose cone halves (See FIGS. 5a,b,c). Once the nose cone and retainer are jettisoned, the protective cover is safely ejected shortly at the start of the aforementioned sunshade deployment process, without causing any harm to the seeker components.

Figure 8:
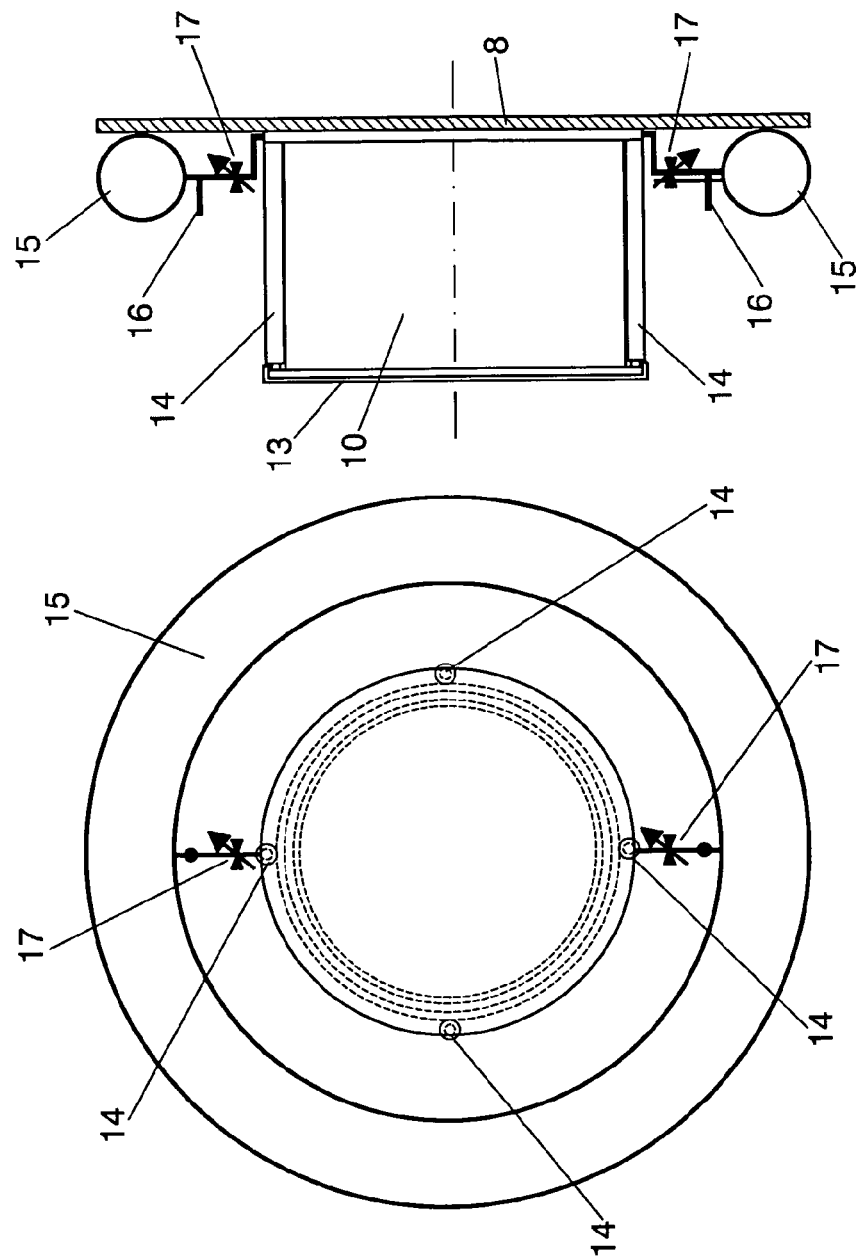
FIG. 8.—Shows a longitudinal section and front views of the EO sensor protection aero-heating blocking device of the invention, wherein the deployable sunshade is shown in a retracted first position, and the sunshade end-cap cover is in place and ready to be ejected by the pneumatic actuators.
Figure 9A:
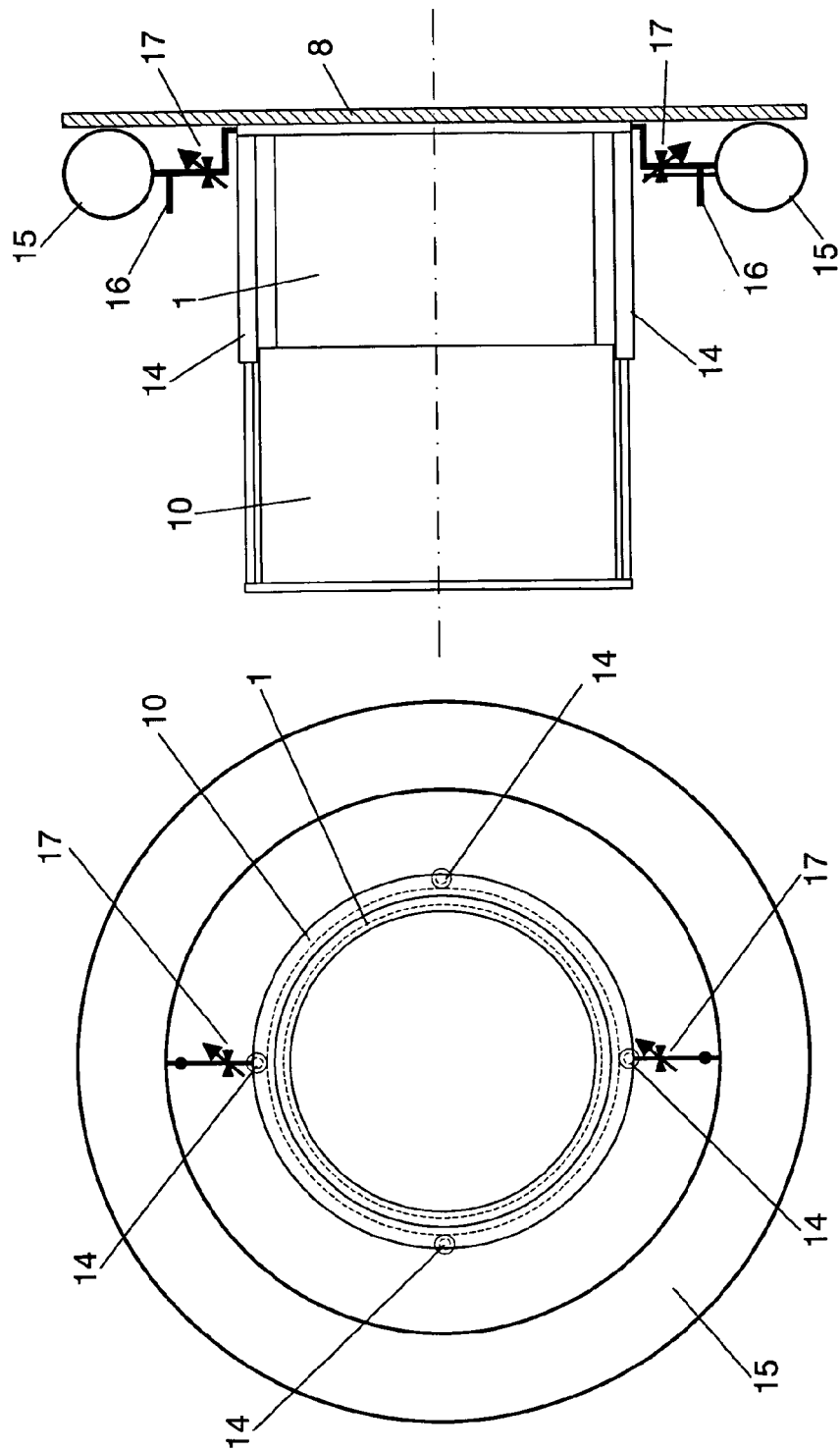
FIG. 9a.—Shows a longitudinal section and front views of the EO sensor protection aero-heating blocking device of the invention, wherein the deployable sunshade is shown in the extended second position.
Figure 9B:
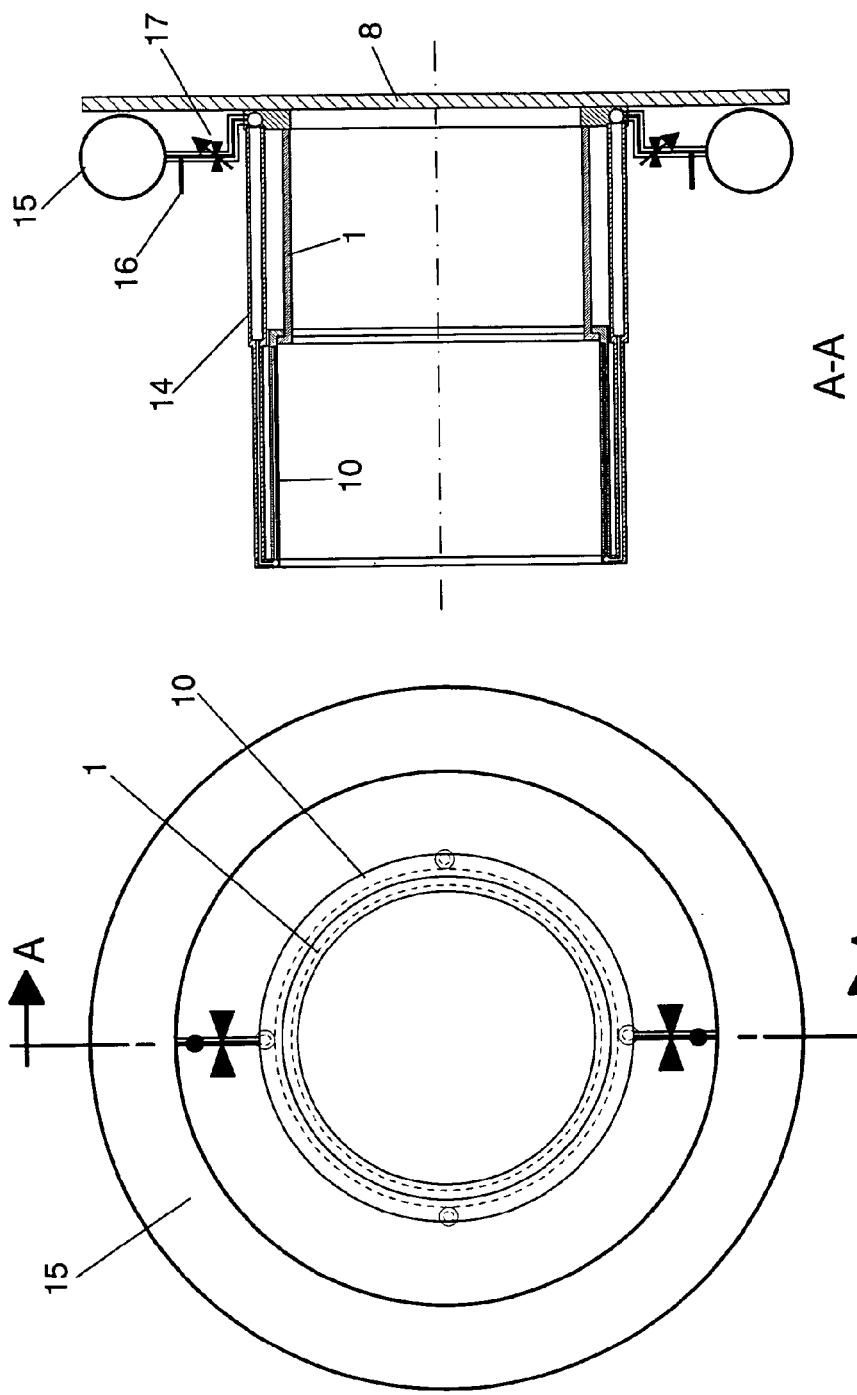
FIG. 9b.—Shows a longitudinal section and a front schematic diagram view of the functional characteristics of the protection aero-heating blocking device assembly of the invention with the deployable sunshade in the extended second position.

It is the object of this invention to install four (4) or more pneumatic pressure actuators (14) in FIGS. 8, 9a and 9b to assure that the deploying sunshade (10) moves parallel to the sensor fixed sunshade.

It is also the object of this invention to use these pneumatic actuators (14) for a triple purpose:
  (a) Ejecting the protective end-cap cover (13),
  (b) Pushing and guiding the deployable sunshade (10), and
  (c) Acting as plenums for routing the driving gas of the pneumatic action, to the manifold of the gas injection elements. The plenums are at an altitude variable, but determined pressure.

It is a further object of this invention to employ a gas container (15) the enclosure of which is morphed to the space available between the sunshade and the nosecone (generically depicted in FIGS. 8 and 9 as a toroidal container).

It is the object of this invention to pressurize the system for pneumatic action by means of a pair of redundant pyrotechnique valves (16) that are enabled at launch by the sequencing computer, thus retaining an acceptable container pressure (without refurbishing) for a typical period of over 20 years.

Figure 10:
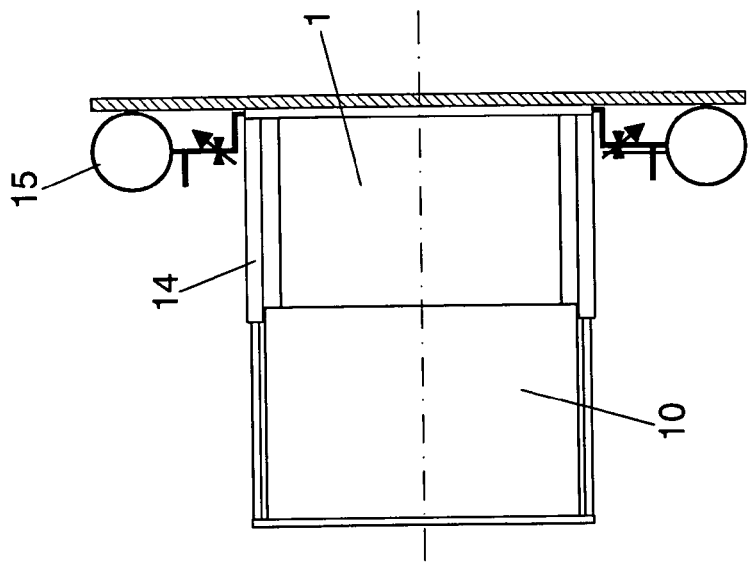
FIG. 10.—Shows three longitudinal section views of the protection aero-heating blocking device of the invention, wherein the deployable sunshade is shown in the retracted first, half way, and extended second positions.
Figure 10:
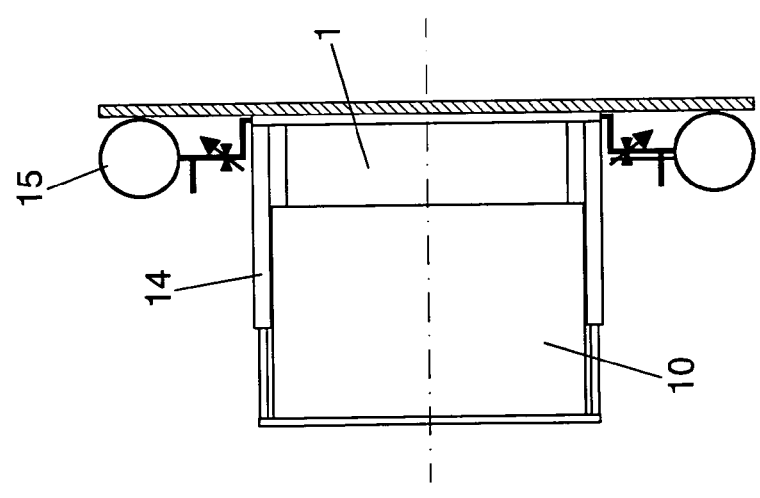
Figure 10:
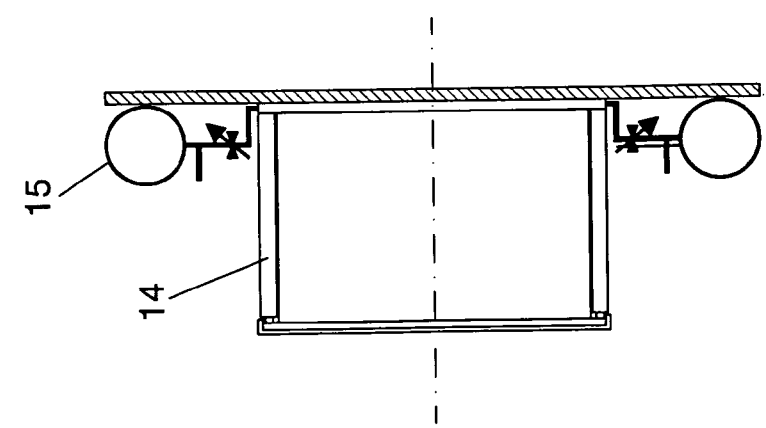
Figure 11:
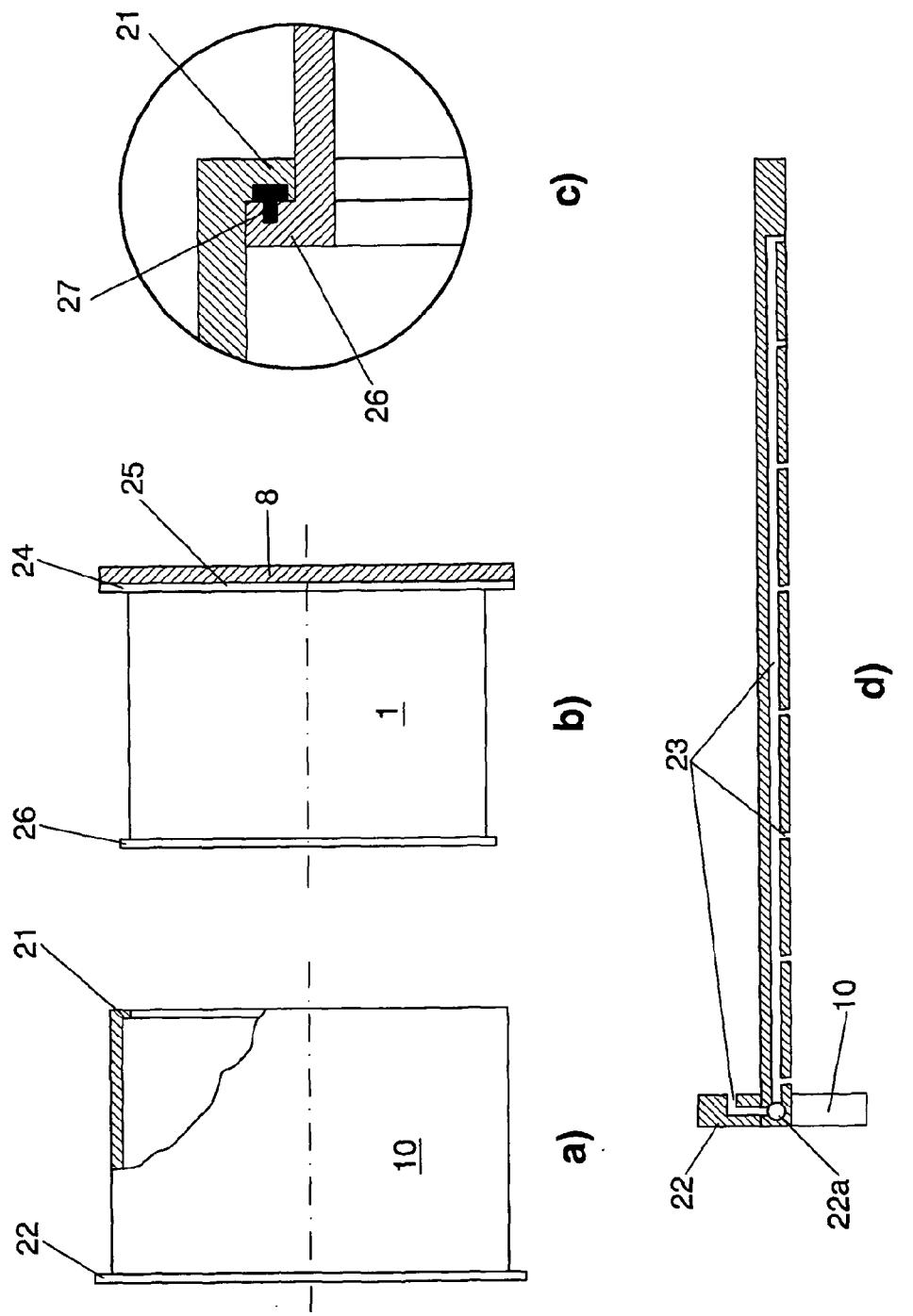
FIG. 11.—Shows four side views with details of the protection aero-heating blocking device assemblies the invention, wherein in view a) the deployable sunshade is shown, in view b) the fixed sunshade is shown, in view c) the interface area between the deployable and fixed sunshades is shown, and finally in view d) the injection manifolds and the annular low pressure manifold in the deployable sunshade are shown.
Figure 12:
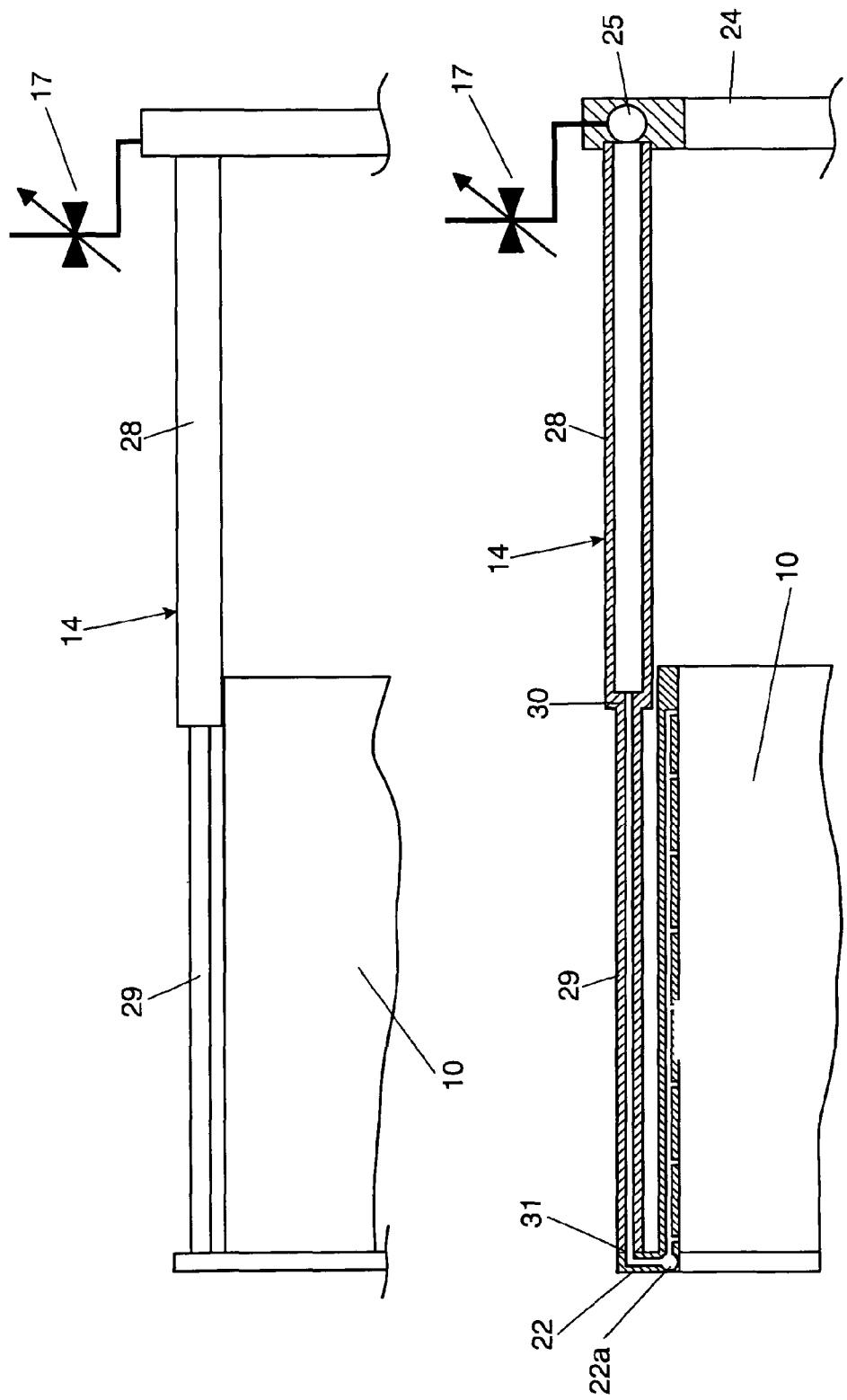
FIG. 12.—Shows a side view and a longitudinal section of a pneumatic actuator and its interface with the deployable sunshade.

It is the object of this invention to enable pneumatic action by means of a pair of redundant pressure regulators (17) able to regulate at altitude dependent levels. The pressure level is held high while the end-cap cover (13) is ejected and the deployable sunshade (10) is being deployed (See FIG. 10). From there on is controlled to minimize the injected gas mass flow rate and still retain a stable flow pattern that blocks the hot air from entering the sunshade cavity.

It is the object of this invention to use a preferred embodiment consisting of an assembly of the following components (See FIGS. 8, 9, 10, 11, and 12):

(a) A special purpose deployable sunshade assembly (10) is designed as a cylindrical shell structure (See FIG. 11a). The inner surface of this cylindrical shell is finished and treated to meet certain optical properties specified by the EO sensor designer. The cylindrical wall ends are reinforced with two stiffening rings (21, 22). The back end stiffener ring (21) at the back end is located inside the cylindrical wall and it is provided with a snap/latch mechanism to interlock onto the outer ring stiffener (26) of the sunshade assembly (1) (FIG. 11c). The free end stiffener ring (22) at the free end of the deployable sunshade (10) has a triple purpose:
  (i) It increases the structural stability of the deployable sunshade (10),
  (ii) It serves as a stop for the piston spigots of the pneumatic actuators (14) (FIG. 9),
  (iii) It has a plurality of orifices that match and fit onto the inner conduits (31) of the pneumatic actuators' piston spigots.

The piston spigots act as conduits for the pressurized gas to be delivered to the annular low pressure manifold (22a) within the ring (22). This manifold feeds four injection manifolds (23) located inside the cylindrical wall of sunshade 10. Manifolds (22a) and injectors (23) are machined and honed inside the cylindrical wall (See FIG. 11d).

(b) A special purpose fixed sunshade assembly (1), also designed as a cylindrical shell structure (See FIG. 11b). The inner surface of this cylindrical shell is also finished and treated to meet the optical specs required by the EO sensor designer. The cylindrical wall ends are reinforced by two stiffening rings. The back end stiffener ring (24) is attached to the KV forward platform (8), and houses within it the high pressure annular manifold (25). The front ring stiffener (26) remains free at the cantilevered end for the purpose of increasing structural stability of the assembly, as well as including the at least one mechanism to latch (27) with stiffener (21) of assembly (10) (FIG. 11c).

(c) One or more pneumatic actuators sub-assemblies (14) (four sub-assemblies will be employed in this description). Each subassembly (FIG. 12) consists of an outer member (28) designed as a barrel, and a piston with its hollow spigot (29). The back end of the barrel is attached to KV forward platform (8) and also attached to stiffener (24) of the fixed sunshade (1), and its end is open to the high pressure manifold (25) within said stiffener. The body of the barrel slides along the outer surface of the deployable sunshade (10) during its extension.

The spigot of piston (29) is designed as a hollow rod. The piston end (30) within the barrel is machined to fit tight-to-slide on the inner surface of barrel (28) and is propelled by gas from high pressure manifold (25). The other end is attached to stiffener (22) of the deployable sunshade (10), and its open end discharges into low pressure manifold (22a). Once the deployable sunshade reaches its extended position, the piston back-end (30) locks onto the barrel forward end, and the assembly is fully locked into the deployed position.

(d) A high-pressure container of an optically inert gas, arranged for the purpose of this description as a toroidal bottle placed at the forward end of the KV and around the sunshade, but it can have any shape compatible with the space available and the application of good engineering design practices. The container has one or more outlets, with one isolation pyrotechnic valve per outlet. The high pressure tubing routes the gas to the pressure regulator, one per outlet, and from here, the high pressure tubing is routed to the annular high pressure manifold (25) within stiffener (24) at the back end of the fixed sunshade.

It is the object of this invention to use the gas leaking from the pressure regulator bleed hole into the sensor cavity, to keep the cavity pressure above the environment within the nose cone, until the said nose cone and cap retainer are jettisoned.

It is a further object of this invention to push the cap forward and out of the way by engaging the pneumatic actuation subsystem.

It is the object of this investigation to use the pressure within the high pressure manifold (25) to drive one or more pneumatic linear actuators to move the deployable sunshade to the extended position.

It is the object of this invention to use one latching mechanism (27) per actuator to lock in place the deployed sunshade respect the fixed sunshade.

It is a further object of this invention to minimize the injected gas mass flowrate while assuring a highly stabilized flow with the extended cavity and in front of the sensor components. This objective is accomplished by operating the flow regulators at such pressure level that the orifice injectors—collocated along the inner wall of the deployed sunshade—operate in the sonic regime all the time, regardless of the altitude and flight speed of the vehicle.

It is the object of this investigation to maintain a highly stabilized flow within the cavity as altitude is gained, by assuring these orifices remain sonic during the trans-atmospheric interval of the mission comprised between the nose ejection event, and the exit to space from the atmosphere, and that the total area of these orifices is sufficient to assure the required total volumetric flow rate under the most demanding conditions.

It is also the object of this invention to keep these orifices sonic at all times by measuring with two flight qualified pressure transducers two pressures: (a) P1, the pressure in the manifold upstream the orifice pattern, and (b) P2, the pressure within the sensor cavity.

It is the object of this invention to minimize the amount of gas to be injected by assuring that the pressure ratio across the orifices is above the value of $$P1/P2 = \left(\frac{(\gamma-1)}{2}\right)^{\left(\frac{\gamma}{(\gamma-1)}\right)}$$

where γ is the specific heat ratio of the injected gas.

It is the object of this invention to arrange for a container to carry the gas to be injected, morphed to the space available between the seeker envelope and the nose cone.

It is the object of this invention to make this container and the isolation pyro valve tight to leaks, to assure that the remaining mass at the end of the storage period is sufficient to perform the mission at the end of 20 years.

It is the object of this invention when the deployed assembly is in place, to achieve downstream of the injectors a highly stabilized flow that acts as an effective blocking barrier that blocks the hot air and other foreign material from entering the cavity and making contact with the sensor components. The sensor keeps in this manner its intended opto-mechanical properties as the components in the cavity are at a uniform temperature that is near the injected gas temperature.

It is the object of this invention that the device as described in this disclosure, can be easily retrofit to existing interceptors, thus improving dramatically their performance without investing in a new missile defense infrastructure.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A protection device for a missile electro-optical (EO) seeker comprising a fixed sunshade that can be mounted surrounding an EO seeker sensor, the fixed sunshade forming a cavity, characterised by comprising:
   at least one deployable sunshade arranged to be moved in a telescopic manner relative to the fixed sunshade between a first position, in which the at least one deployable sunshade substantially does not protrude the fixed sunshade, and a second position, in which the at least one deployable sunshade is deployed with respect to the fixed sunshade, thus creating a longer cavity with respect to the first position; and
   at least one container for a pressurizing optically-inert gas;
   wherein in the second position, the optically-inert gas can be injected into a space forward facing the sensor in the cavity, forming a highly stable flow pattern.

2. The protection device for a missile EO seeker of claim 1, further comprising at least one pneumatic pressure actuator arranged to deploy the at least one deployable sunshade and supplying gas to gas injection manifolds and injectors located in the inner surface of the at least deployable sunshade.

3. The protection device for a missile EO seeker of claim 1, wherein the at least one deployable sunshade and the fixed sunshade are configured as a cylindrical assembly, the deployablcorrected, DD.e sunshade being arranged to slide forward and parallel to the fixed sunshade until at least one stop makes contact, resulting thus in a longer cavity.

4. The protection device for a missile EO seeker of claim 1, further comprising a sunshade cover in the open space of the fixed sunshade when the at least one deployable sunshade is in the first position, the sunshade cover being ejected when the at least one deployable sunshade is being deployed when passing from the first to the second position.

5. The protection device for a missile EO seeker of claim 1, wherein the container for a pressurizing optically-inert gas comprises at least one variable-setting pressure regulator, to pressurize the system for pneumatic action by means of a pair of redundant pyrotechnic valves that are enabled at launch by the sequencing computer, thus retaining an acceptable container pressure without refurbishing.

6. The protection device for a missile EO seeker of claim 5, further comprising at least one redundant pressure regulator, at a high pressure level setting, to be held while the deployable sunshade is being deployed when passing from the first to the second position.

7. The protection device for a missile EO seeker of claim 5, wherein the at least one deployable sunshade is cylindrical and its cylindrical wall ends are reinforced with two stiffening rings, wherein the back end stiffener ring at the back end is located inside the cylindrical wall and it is provided with a snap/latch mechanism to interlock onto an outer ring stiffener of the fixed sunshade, and wherein the free end stiffener ring at the free end of the at least one deployable sunshade acts as a stop for the piston drives of the pneumatic actuators, the free end stiffener ring further having a plurality of orifices that fit into each one of the inner orifice of the pneumatic actuators piston-spigots, these orifices acting as conduits for the pressurized gas to be delivered to an annular low-pressure manifold arranged within the free end stiffener ring.

8. The protection device for a missile EO seeker of claim 1, wherein each pneumatic actuator comprises an outer member, configured as a barrel, and a piston, the back end of the barrel being attached to a back end stiffener ring fixed to the fixed sunshade and to the forward KV platform, wherein the back end stiffener ring houses an annular cavity that acts as a high-pressure manifold with gas being fed directly from at least on pressure regulator, wherein the body of the barrel is configured to slide along the outer surface of the deployable sunshade during its deployment.

9. The protection device for a missile EO seeker of claim 8, wherein the spigot of piston is designed as a hollow rod, the end within the barrel is machined to fit tight-to-slide on the inner surface of barrel and is propelled by gas from high pressure manifold, the other end is attached to stiffener of the deployable sunshade, and its open end discharges into low pressure manifold, once the deployable sunshade reaches its extended position, the piston back-end locks onto the barrel forward end, and the assembly is fully locked into the deployed position.

10. An anti-missile interceptor, comprising:
a platform comprising of a forward section of a missile;
an electro-optical (EO) seeker sensor mounted on said platform; and
an assembly of structures and mechanisms surrounding said EO seeker sensor and forming a cavity, characterised by comprising a fixed sunshade that can be mounted surrounding said EO sensor, the fixed sunshade forming a cavity, and a protection device comprising:
at least one deployable sunshade arranged to be moved in a telescopic manner relative to the fixed sunshade between a first position, in which the at least one deployable sunshade substantially does not protrude the fixed sunshade, and a second position, in which the at least one deployable sunshade is deployed with respect to the fixed sunshade, thus creating a longer cavity with respect to the first position; and
at least one container for a pressurizing optically-inert gas;
wherein in the second position, the optically-inert gas can be injected into a space forward facing the sensor in the cavity, forming a highly stable flow pattern.

11. A tactical missile, comprising:
a platform comprising a generic forward section of a missile;
an electro-optical (EO) seeker sensor mounted on said platform; and
an assembly of structures and mechanisms surrounding said EO seeker sensor and forming a cavity, characterised by comprising a fixed sunshade that can be mounted surrounding said EO sensor, the fixed sunshade forming a cavity, and a protection device comprising:
at least one deployable sunshade arranged to be moved in a telescopic manner relative to the fixed sunshade between a first position, in which the at least one deployable sunshade substantially does not protrude the fixed sunshade, and a second position, in which the at least one deployable sunshade is deployed with respect to the fixed sunshade, thus creating a longer cavity with respect to the first position; and
at least one container for a pressurizing optically-inert gas;
wherein in the second position, the optically-inert gas can be injected into a space forward facing the sensor in the cavity, forming a highly stable flow pattern.

12. A method for increasing the probability of interception of a missile without geographical nor altitude limitations, characterised by using an anti-missile provided with an electro-optical, EOE seeker sensor, a fixed sunshade that can be mounted surrounding said EO sensor, the fixed sunshade forming a cavity, and further comprising a protection device comprising:
at least one deployable sunshade arranged to be moved in a telescopic manner relative to the fixed sunshade between a first position, in which the at least one deployable sunshade substantially does not protrude the fixed sunshade, and a second position, in which the at least one deployable sunshade is deployed with respect to the fixed sunshade, thus creating a longer cavity with respect to the first position; and
at least one container for a pressurizing optically-inert gas;
wherein in the second position, the optically-inert gas can be injected into a space forward facing the sensor in the cavity, forming a highly stable flow pattern.

13. The method of claim 12, wherein:
the deployable sunshade is retracted during storage, launch, and ascent trajectory, but it is in an extended position after a nose cone of the tactile missile is ejected; and
once the nose cone and a retainer of the tactile missile are jettisoned, a protective cover is safely ejected as the deployable sunshade is extended.

14. Method for increasing flight speeds of a tactical missile, characterised by using a tactical missile provided with an imaging electro-optical (EO) seeker sensor, a fixed sunshade that can be mounted surrounding said EO sensor, the fixed sunshade forming a cavity, and further comprising a protection device comprising:
at least one deployable sunshade arranged to be moved in a telescopic manner relative to the fixed sunshade between a first position, in which the at least one deployable sunshade substantially does not protrude the fixed sunshade, and a second position, in which the at least one deployable sunshade is deployed with respect to the fixed sunshade, thus creating a longer cavity with respect to the first position; and
at least one container for a pressurizing optically-inert gas;
wherein in the second position, the optically-inert gas can be injected into a space forward facing the sensor in the cavity, forming a highly stable flow pattern.

15. The method of claim 13, wherein:
the deployable sunshade is retracted during storage, launch, and ascent trajectory, but it is in an extended position after a nose cone of the tactile missile is ejected; and once the nose cone and a retainer of the tactile missile are jettisoned, a protective cover is safely ejected as the deployable sunshade is extended.

16. The method of claim 14, further comprising using at least one pneumatic actuator for a triple purpose comprising:
ejecting the protective cover;
pushing and guiding the deployable sunshade; and
acting as plenums for routing the driving gas of the pneumatic action to a manifold of gas injection elements.

* * * * *